US008687307B1

(12) United States Patent
Patton, III

(10) Patent No.: US 8,687,307 B1
(45) Date of Patent: Apr. 1, 2014

(54) DISK DRIVE DETECTING GAS LEAKING FROM HEAD DISK ASSEMBLY

(75) Inventor: Charles R. Patton, III, Murrieta, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 413 days.

(21) Appl. No.: 12/949,680

(22) Filed: Nov. 18, 2010

(51) Int. Cl.
*G11B 5/60* (2006.01)
*G11B 21/21* (2006.01)
*G11B 33/14* (2006.01)

(52) U.S. Cl.
USPC .............................................. 360/55; 360/69

(58) Field of Classification Search
None
See application file for complete search history.

(56) References Cited

U.S. PATENT DOCUMENTS

| | | | |
|---|---|---|---|
| 4,625,545 A | 12/1986 | Holm et al. | |
| 5,454,157 A | 10/1995 | Ananth et al. | |
| 5,784,415 A | 7/1998 | Chevillat et al. | |
| 5,809,080 A | 9/1998 | Karabed et al. | |
| 5,825,581 A | 10/1998 | Morita et al. | |
| 5,978,163 A | 11/1999 | Cunningham | |
| 6,055,120 A | 4/2000 | Schirle | |
| 6,078,455 A | 6/2000 | Enarson et al. | |
| 6,088,662 A | 7/2000 | Flinsbaugh et al. | |
| 6,185,175 B1 | 2/2001 | Zook | |
| 6,266,203 B1 | 7/2001 | Street et al. | |
| 6,392,838 B1 | 5/2002 | Hearn et al. | |
| 6,525,899 B2 | 2/2003 | Hearn et al. | |
| 6,567,235 B2 | 5/2003 | Kasetty et al. | |
| 6,580,574 B1 | 6/2003 | Codilian | |
| 6,600,617 B1 | 7/2003 | Zeng | |
| 6,603,628 B1 | 8/2003 | Gillis et al. | |
| 6,644,362 B2 | 11/2003 | Bernett | |
| 6,646,821 B2 | 11/2003 | Bernett et al. | |
| 6,683,747 B2 | 1/2004 | Bernett | |
| 6,731,453 B2 | 5/2004 | Korbel et al. | |
| 6,741,955 B2 | 5/2004 | Rutherford et al. | |
| 6,744,586 B2 | 6/2004 | Ukani et al. | |
| 6,819,517 B2 | 11/2004 | Fioravanti et al. | |
| 6,958,876 B2 | 10/2005 | Feliss et al. | |
| 7,009,800 B2 | 3/2006 | Yang | |
| 7,016,145 B2 | 3/2006 | Gunderson et al. | |
| 7,062,387 B1 | 6/2006 | Burns et al. | |
| 7,079,348 B2 | 7/2006 | Ishii et al. | |
| 7,101,031 B2 | 9/2006 | Medin | |
| 7,184,237 B2 | 2/2007 | Shi | |
| 7,191,083 B2 | 3/2007 | Ashley et al. | |
| 7,194,674 B2 | 3/2007 | Okumura et al. | |

(Continued)

FOREIGN PATENT DOCUMENTS

| | | |
|---|---|---|
| JP | 62058484 A2 | 3/1987 |
| JP | 2003303402 A | 4/2002 |
| KR | 838877 B1 | 6/2008 |

OTHER PUBLICATIONS

U.S. Appl. No. 12/478,606, filed Jun. 4, 2009, 22 pages.

*Primary Examiner* — Wayne Young
*Assistant Examiner* — James L Habermehl

(57) ABSTRACT

A disk drive is disclosed comprising a head disk assembly (HDA) filled with a gas, the HDA comprising a head actuated over a disk, and an electrical heating element. A pressure inside the HDA is measured, and the electrical heating element is heated for a first heating time. A rate of temperature change of the electrical heating element is measured, and the gas leaking from the HDA is detected in response to the pressure and the rate of temperature change.

18 Claims, 7 Drawing Sheets

(56) References Cited

U.S. PATENT DOCUMENTS

| | | | |
|---|---|---|---|
| 7,236,321 B1 | 6/2007 | Fukushima | |
| 7,280,306 B2 | 10/2007 | Tanaka et al. | |
| 7,417,820 B2 | 8/2008 | Otsuki et al. | |
| 7,426,089 B2 | 9/2008 | Wada et al. | |
| 7,434,987 B1 | 10/2008 | Gustafson et al. | |
| 7,620,519 B2 | 11/2009 | Yoon | |
| 7,738,211 B2* | 6/2010 | Oyamada et al. | 360/75 |
| 7,808,740 B2* | 10/2010 | Tanabe | 360/75 |
| 7,924,527 B2* | 4/2011 | Aoyagi et al. | 360/97.22 |
| 8,107,185 B2* | 1/2012 | Okamoto et al. | 360/75 |
| 8,248,724 B2* | 8/2012 | Hayakawa et al. | 360/97.22 |
| 2003/0179489 A1 | 9/2003 | Bernett et al. | |
| 2004/0264028 A1 | 12/2004 | Ishii et al. | |
| 2007/0076826 A1 | 4/2007 | Stockmanns et al. | |
| 2007/0159708 A1 | 7/2007 | Fukushima | |
| 2007/0201585 A1 | 8/2007 | Feng | |
| 2008/0068755 A1 | 3/2008 | Aoyagi et al. | |
| 2008/0186621 A1 | 8/2008 | Partee | |
| 2009/0296271 A1 | 12/2009 | Feliss et al. | |

\* cited by examiner

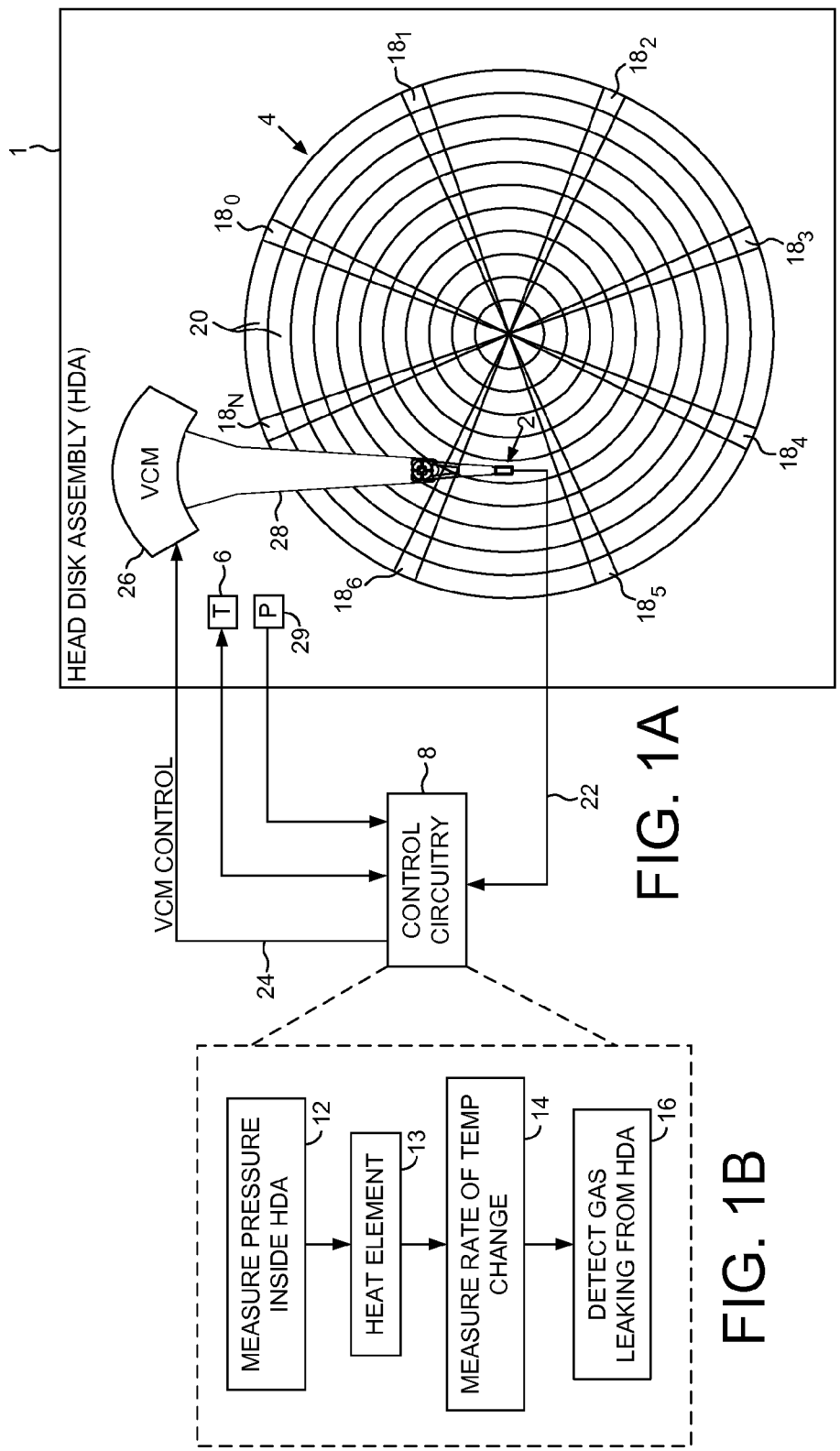

DISK DRIVE DETECTING GAS LEAKING FROM HEAD DISK ASSEMBLY

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

An air bearing forms between the head and the disk due to the disk rotating at high speeds. Since the quality of the write/read signal depends on the fly height of the head, conventional heads (e.g., magnetoresistive heads) may comprise an actuator for controlling the fly height. Any suitable fly height actuator may be employed, such as a piezoelectric (PZT) actuator. The ability to maintain the fly height of the head over the disk surface is affected by the rotation speed of the disk, as well as the type of gas present within the head disk assembly (HDA) that houses the heads and the disks. For example, the prior art has suggested to inject helium into the HDA to enable higher disk rotation speeds in order to achieve better fly height control as well as faster throughput.

BRIEF DESCRIPTION OF THE DRAWINGS

FIG. 1A shows a disk drive according to an embodiment of the present invention comprising a head disk assembly (HDA) filled with gas and comprising a head actuated over a disk and an electrical heating element.

FIG. 1B is a flow diagram according to an embodiment of the present invention wherein the gas leaking from the HDA is detected by measuring a pressure inside the HDA and a rate of temperature change of the heating element.

DETAILED DESCRIPTION OF EMBODIMENTS OF THE INVENTION

Figure 2A:
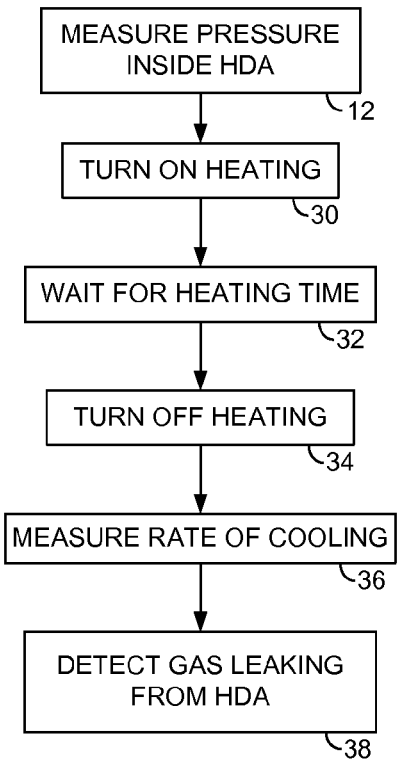
FIG. 2A is a flow diagram according to an embodiment of the present invention wherein a rate of cooling is measured to detect the gas leaking from the HDA.

FIG. 1A shows a disk drive according to an embodiment of the present invention comprising a head disk assembly (HDA) 1 filled with a gas, the HDA comprising a head 2 actuated over a disk 4, and an electrical heating element 6. The disk drive further comprises control circuitry 8 operable to execute the flow diagram of FIG. 1B, wherein a pressure inside the HDA is measured (step 12), and the electrical heating element is heated for a first heating time (step 13). A rate of temperature change of the electrical heating element is measured (step 14), and the gas leaking from the HDA is detected in response to the pressure and the rate of temperature change (step 16).

In the embodiment of FIG. 1A, the disk 4 comprises a plurality of servo sectors $18_0$-$18_N$ that define a plurality of data tracks 20. The control circuitry 8 processes a read signal 22 to demodulate the servo sectors $18_0$-$18_N$ into a position error signal (PES). The PES is filtered with a suitable compensation filter to generate a control signal 24 applied to a voice coil motor (VCM) 26 which pivots an actuator arm 28 to position the head 2 radially over the disk 4 in a direction that reduces the PES. The servo sectors $18_0$-$18_N$ may comprise any suitable position information, such as a track address for coarse positioning and servo bursts for fine positioning.

In the embodiment of FIG. 1A, the HDA comprises a suitable pressure sensor 29 for measuring the pressure inside the HDA, wherein the pressure sensor 29 may comprise any suitable sensor such as any suitable silicon based pressure sensor (e.g., a silicon MEMS pressure sensor). Similarly, any suitable heating element 6 may be employed in the embodiments of the present invention, such as any suitable resistor, thermistor, diode, etc.

The HDA may be filled with any suitable gas that may improve the performance of the disk drive, such as improving fly-height control or increasing the rotation speed of the disk in order to increase throughput. For example, in one embodiment, the HDA may be filled (injected) with helium. However, the gas may gradually leak from the HDA (e.g., diffuse through the HDA seals) which has a detrimental affect on the disk drive. Accordingly, the embodiments of the present invention detect when the gas has leaked from the HDA (i.e., when a mixture of gas and air changes within the HDA) so that appropriate protective action can be taken, such as reducing the rotation speed of the disk and/or warning a host of impending failure.

FIG. 2A is a flow diagram according to an embodiment of the present invention for detecting the gas leaking from the HDA. The pressure inside the HDA is measured (step 12) and a heating power is applied to the electrical heating element (step 30) for a predetermined heating time (step 32). The heating power is then turned off (step 34) and a rate of cooling of the electrical heating element is measured (step 36). The gas leaking from the HDA is detected in response to the measured pressure and the rate of cooling (step 38).

Figure 2B:
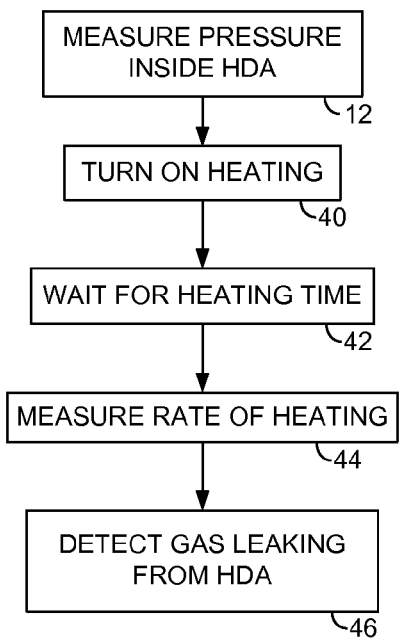
FIG. 2B is a flow diagram according to an embodiment of the present invention wherein a rate of heating is measured to detect the gas leaking from the HDA.

FIG. 2B is a flow diagram according to an embodiment of the present invention for detecting the gas leaking from the HDA. The pressure inside the HDA is measured (step 12) and a heating power is applied to the electrical heating element (step 40) for a predetermined heating time (step 42). A rate of heating of the electrical heating element is measured (step 44), and the gas leaking from the HDA is detected in response to the measured pressure and the rate of heating (step 46).

Figure 3A:
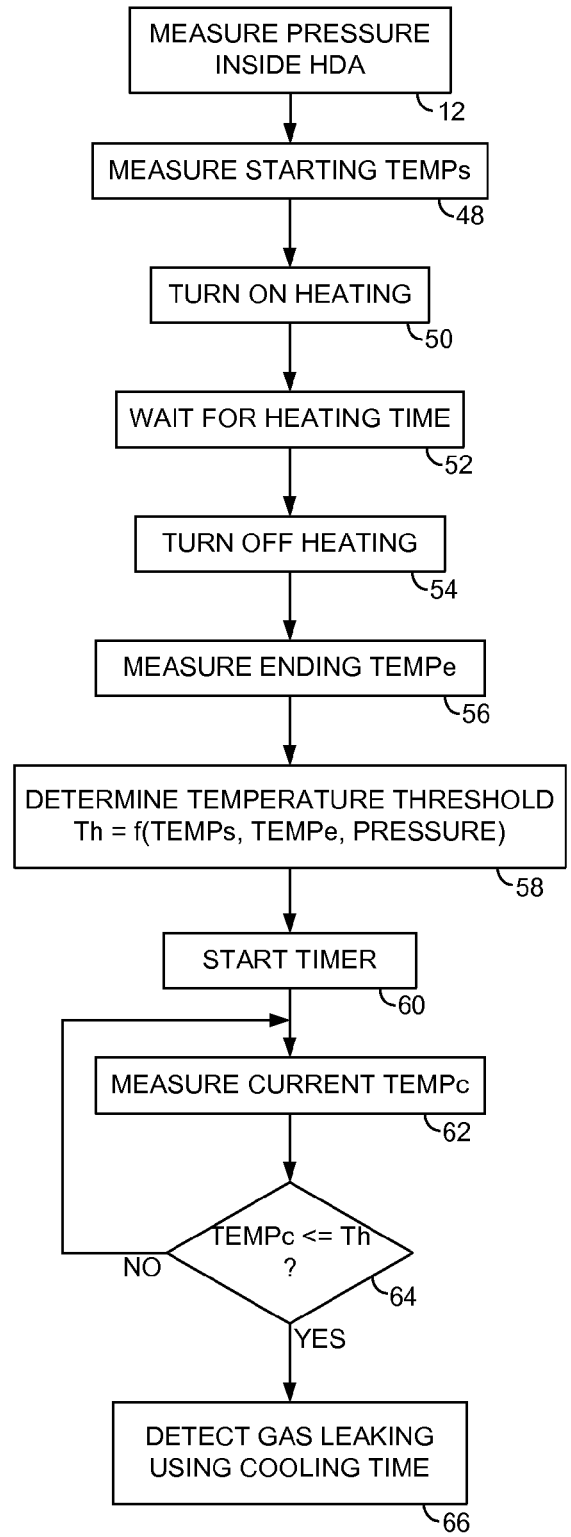
FIG. 3A is a flow diagram according to an embodiment of the present invention wherein a cooling time needed to cool the electrical heating element to a target temperature is measured.

Any suitable algorithm may be employed to measure the rate of cooling of the electrical heating element after applying the heating power. FIG. 3A is a flow diagram according to an embodiment of the present invention wherein the pressure inside the HDA is measured (step 12). The starting temperature (TEMPS) of the electrical heating element is measured (step 48) prior to applying the heating power to the heating element (step 50). After waiting for the heating time (step 52), the heating power is turned off (step 54) and the ending temperature (TEMPe) of the electrical heating element is measured (step 56). A temperature threshold is determined in response to the TEMPs, TEMPe, and the measured pressure (step 58). The temperature threshold may be determined using any suitable technique, such as a suitable function or lookup table. A timer is started (step 60) and the temperature of the electrical heating element is measured (step 62) until the temperature falls below the threshold (step 64). The gas leaking from the HDA is detected based on the cooling time for the electrical heating element to cool to the temperature threshold (step 66).

Figure 3B:
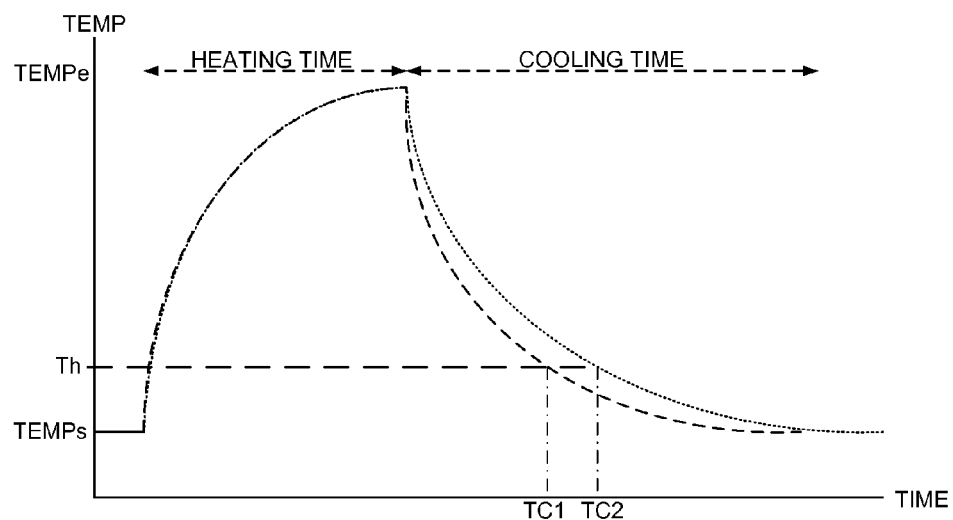
FIG. 3B illustrates how for a particular pressure inside the HDA the cooling time varies based on the mixture of the gas and air inside the HDA according to an embodiment of the present invention.

FIG. 3B illustrates an example of the flow diagram of FIG. 3A for two different mixtures of the gas (e.g., helium) and air inside the HDA at a particular pressure. At a first mixture, a first cooling time (TC1) is needed to cool the electrical heating element to the temperature threshold, whereas at a second mixture, a second cooling time (TC2) is needed to cool the electrical heating element to the temperature threshold. In one embodiment, the different curves shown in FIG. 3B are generated at different pressures within the HDA and for different mixtures of gas and air (i.e., different mixtures of gas and air are injected into the HDA). The calibrated curves are then used to generate a suitable function (e.g., using a suitable curve fitting algorithm), or suitable lookup tables for correlating the pressure and cooling rate with the mixture of gas and air in the HDA while each disk drive is deployed in the field.

Figure 4B:
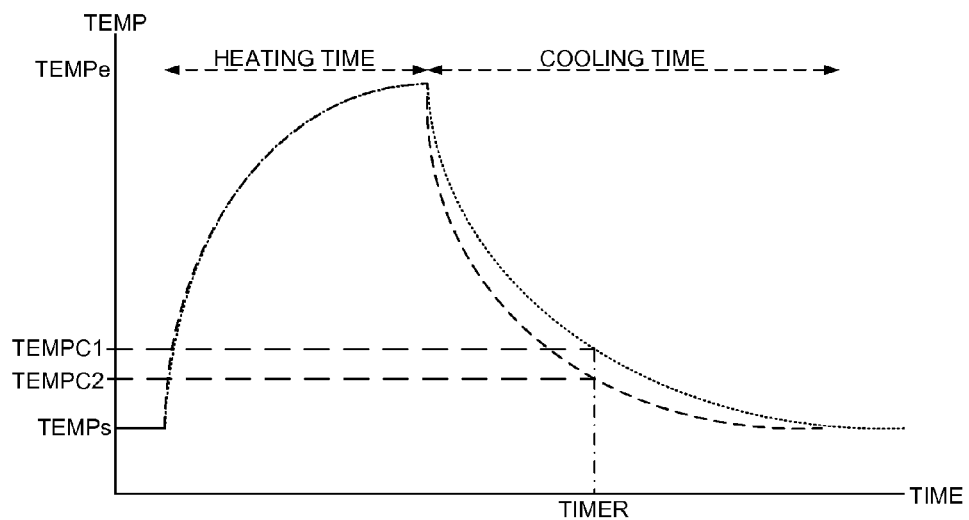
FIG. 4B illustrates how for a particular pressure inside the HDA the ending temperature after the cooling time varies based on the mixture of the gas and air inside the HDA according to an embodiment of the present invention.
Figure 4A:
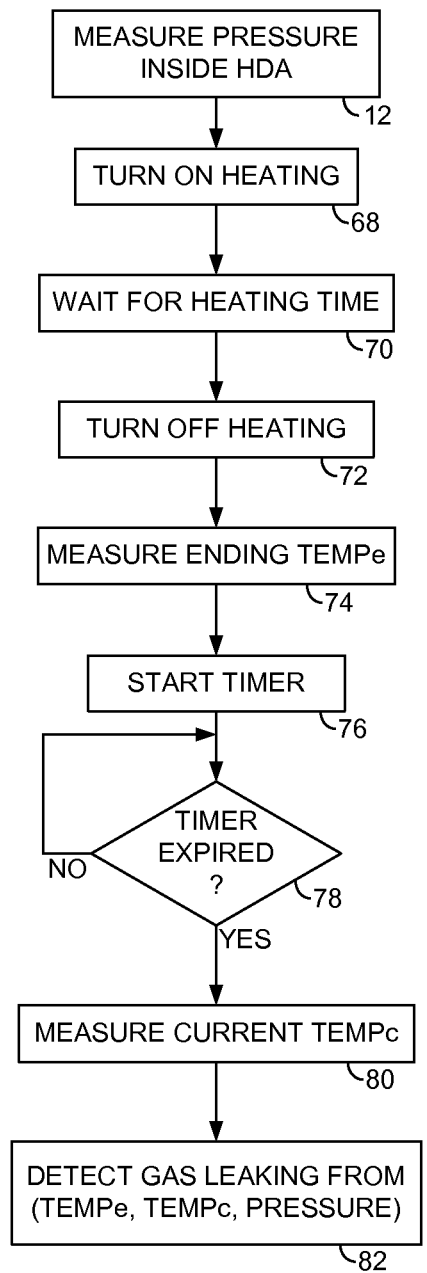
FIG. 4A is a flow diagram according to an embodiment of the present invention wherein an ending temperature is measured after a cooling time.

FIG. 4A is a flow diagram according to an alternative embodiment of the present invention for detecting the gas leaking from the HDA. The pressure inside the HDA is measured (step 12). After applying the heating power (step 68) for the heating time (step 70) and turning of the heating power (step 72), the ending temperature (TEMPe) of the electrical heating element is measured (step 74). A timer is then started (step 76) and after a predetermined interval (step 78) the current temperature (TEMPc) of the electrical heating element is measured (step 80). The gas leaking from the HDA is detected in response to the TEMPe, TEMPc, and the pressure (step 82).

FIG. 4B illustrates an example of the flow diagram of FIG. 4A for two different mixtures of the gas (e.g., helium) and air inside the HDA at a particular pressure. At a first mixture, the electrical heating element cools to a first temperature (TEMPC1) after the cooling interval, whereas at a second mixture, the electrical heating element cools to a second temperature (TEMPC2) after the cooling interval. Similar to the embodiment described above with reference to FIG. 3B, similar curves are calibrated for a number of different pressures and a number of different mixtures of gas and air. The calibrated curves are then used to generate a suitable function (e.g., using a suitable curve fitting algorithm), or suitable lookup tables for correlating the pressure and cooling rate with the mixture of gas and air in the HDA while each disk drive is deployed in the field.

Figure 5:
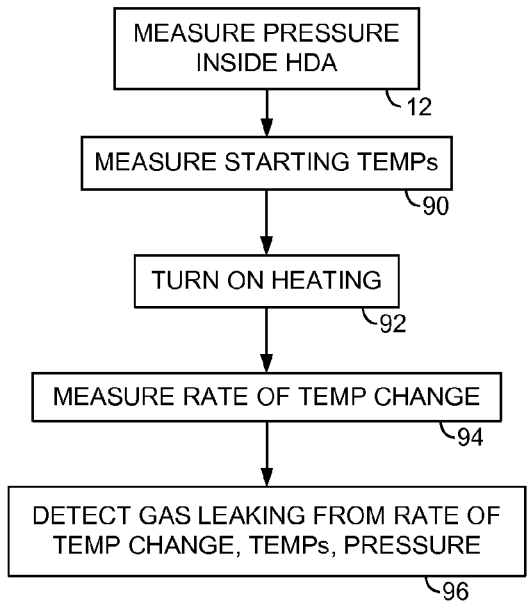
FIG. 5 is a flow diagram according to an embodiment of the present invention wherein a starting temperature of the electrical heating element is measured and used to detect the gas leaking from the HDA.

In one embodiment, the rate of temperature change (e.g., the exponential curves shown in FIGS. 3B and 4B) may vary depending on the starting temperature (the ambient temperature) before the heating power is applied to the electrical heating element. Therefore, in one embodiment shown in the flow diagram of FIG. 5, the starting temperature of the electrical heating element is measured (step 90) just prior to applying the heating power (step 92). After measuring the rate of temperature change (step 94), the gas leaking from the HDA is detected in response to the rate of temperature change, the starting temperature (TEMPS), and the pressure (step 96). For example, these variables may be used to index a three dimensional table, or they may be input into a function that computes the mixture of the gas to air.

Figure 6A:
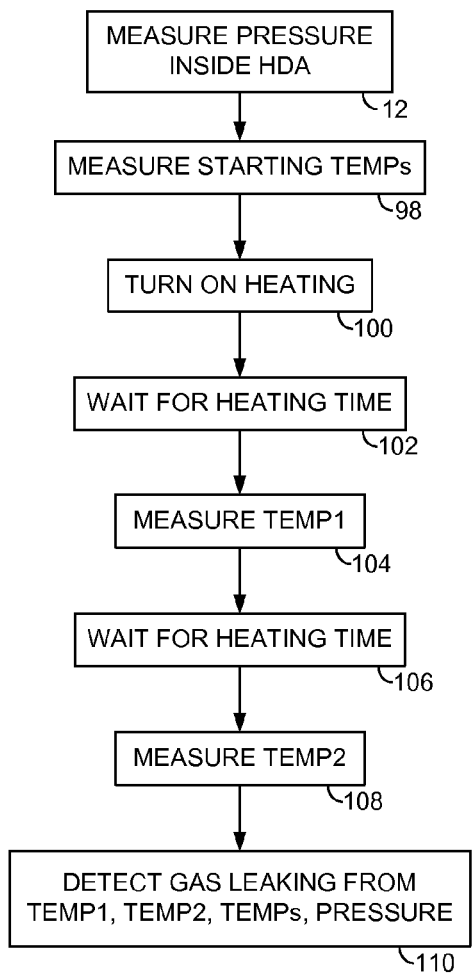
FIG. 6A is a flow diagram according to an embodiment of the present invention wherein a rate of heating of the electrical heating element is measured to detect the gas leaking from the HDA.

FIG. 6A is a flow diagram according to an embodiment of the present invention wherein a rate of heating is measured to detect the gas leaking from the HDA. The pressure inside the HDA is measured (step 12), and the starting temperature (TEMPS) of the electrical heating element is measured (step 98). The heating power is applied to the electrical heating element (step 100) for a first heating time (step 102), and then a first temperature (TEMP1) is measured (step 104). After a second heating time (step 106) a second temperature (TEMP2) is measured (step 108). The gas leaking from the HDA is detected in response to the TEMP1, TEMP2, TEMPs, and the pressure (step 110).

Figure 6B:
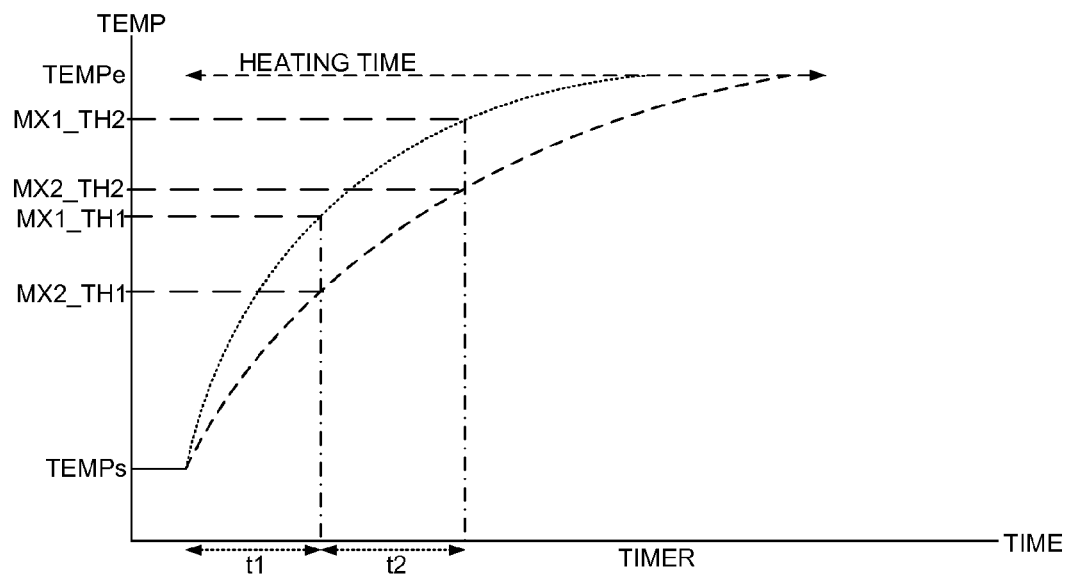
FIG. 6B illustrates how for a particular pressure inside the HDA the rate of heating of the electrical heating element varies based on the mixture of the gas and air inside the HDA according to an embodiment of the present invention.

FIG. 6B illustrates an example of the flow diagram of FIG. 6A for two different gas and air mixtures within the HDA at a particular pressure. At a first mixture (MX1), a first temperature (MX1_TH1) is measured after a first heating time t1, and a second temperature (MX1_TH2) is measured after a second heating time t2. At a second mixture (MX2), a first temperature (MX2_TH1) is measured after a first heating time t1, and a second temperature (MX2_TH2) is measured after a second heating time t2. The measured temperatures and pressure may index a suitable table to determine the current gas/air mixture within the HDA. As described above with reference to FIG. 5, the starting temperature (TEMPs) may also adjust the table value or computed value since the rate of heating may vary depending on the starting ambient temperature of the electrical heating element.

Figure 7:
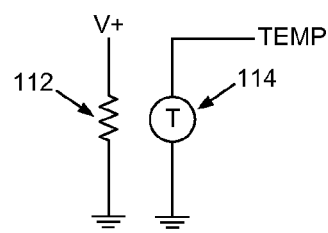
FIG. 7 shows an embodiment of the present invention wherein a temperature sensor is located proximate the electrical heating element.

Any suitable electrical heating element and control circuitry for measuring a rate of temperature change of the electrical heating element may be employed in the embodiments of the present invention. In one embodiment, the electrical heating element and temperature sensor may be integrated into a thermistor having a resistance that varies inversely with temperature. In an alternative embodiment shown in FIG. 7, the electrical heating element may comprise a resistor 112 or other passive component such as a coil that is heated with current, and a separate temperature sensor 114 located proximate the electrical heating element for measuring the heat radiating from the resistor 112.

In one embodiment, the electrical heating element is mounted in the disk drive at a location that is exposed to the windage generated as the disk rotates. For example, the electrical heating element may be mounted near (or integrated with) a flex circuit that couples a preamp circuit to other control circuitry (e.g., a read channel circuit), or mounted on the actuator arm near the preamp circuit. In this embodiment, the affect the windage has on the rate of temperature change of the electrical heating element depends on the pressure and mixture of gas and air. That is, the rate the windage carries heat energy away from the electrical heating element depends on the pressure and gas/air mixture, and therefore the rate of temperature change at a given pressure provides a measure of the gas leaking from the HDA.

In other embodiments of the present invention, the rate of temperature change of the electrical heating element may be measured with techniques other than those described above. For example, a derivative of the measured temperature signal may be computed using analog or digital circuitry. In another embodiment, the temperature signal may be sampled and then curve fit to a suitable function (e.g., an exponential function) which represents the rate of temperature change.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a head disk assembly (HDA) filled with a gas, the HDA comprising:
      a disk;
      a head actuated over the disk;
      an electrical heating element; and
   control circuitry operable to:
      measure a pressure inside the HDA;
      heat the electrical heating element for a first heating time;
      measure a rate of temperature change of the electrical heating element; and
      detect the gas leaking from the HDA in response to the pressure and the rate of temperature change by:
         measuring a starting temperature (TEMPs) of the electrical heating element before heating the heating element;
         measuring an ending temperature (TEMPe) of the electrical heating element after the first heating time;
         determining a temperature threshold in response to TEMPs and TEMPe;
         measuring a cooling time required for the temperature of the electrical heating element to cool to the temperature threshold; and
         detecting the gas leaking from the HDA in response to the cooling time.

2. The disk drive as recited in claim 1, wherein the rate of temperature change is a rate of cooling.

3. The disk drive as recited in claim 2, wherein the control circuitry is further operable to:
   measure an ending temperature (TEMPe) of the electrical heating element after the first heating time;
   wait for a predetermined cooling time after the first heating time;
   measure a cooled temperature (TEMPc) of the electrical heating element after the cooling time; and
   detect the gas leaking from the HDA in response to the TEMPe and the TEMPc.

4. The disk drive as recited in claim 1, wherein the rate of temperature change is a rate of heating.

5. The disk drive as recited in claim 4, wherein the control circuitry is further operable to:
   measure a first temperature (TEMP1) of the electrical heating element after the first heating time;
   heat the electrical heating element for a second heating time;
   measure a second temperature (TEMP2) of the electrical heating element after the second heating time; and
   detect the gas leaking from the HDA in response to the TEMP1 and the TEMP2.

6. The disk drive as recited in claim 1, wherein the electrical heating element comprises a thermistor.

7. The disk drive as recited in claim 1, wherein the electrical heating element comprises a diode.

8. The disk drive as recited in claim 1, further comprising a temperature sensor located proximate the electrical heating element.

9. A method of operating a disk drive comprising a head disk assembly (HDA) filled with a gas, the HDA comprising a head actuated over a disk and an electrical heating element, the method comprising:
   measuring a pressure inside the HDA;
   heating the electrical heating element for a first heating time;
   measuring a rate of temperature change of the electrical heating element; and
   detecting the gas leaking from the HDA in response to the pressure and the rate of temperature change by:
      measuring a starting temperature (TEMPs) of the electrical heating element before heating the heating element;
      measuring an ending temperature (TEMPe) of the electrical heating element after the first heating time;
      determining a temperature threshold in response to TEMPs and TEMPe;
      measuring a cooling time required for the temperature of the electrical heating element to cool to the temperature threshold; and
      detecting the gas leaking from the HDA in response to the cooling time.

10. The method as recited in claim 9, wherein the rate of temperature change is a rate of cooling.

11. The method as recited in claim 10, further comprising:
   measuring an ending temperature (TEMPe) of the electrical heating element after the first heating time;
   waiting for a predetermined cooling time after the first heating time;
   measuring a cooled temperature (TEMPc) of the electrical heating element after the cooling time; and
   detecting the gas leaking from the HDA in response to the TEMPe and the TEMPc.

12. The method as recited in claim 9, wherein the rate of temperature change is a rate of heating.

13. The method as recited in claim 12, further comprising:
measuring a first temperature (TEMP1) of the electrical heating element after the first heating time;
heating the electrical heating element for a second heating time;
measuring a second temperature (TEMP2) of the electrical heating element after the second heating time; and
detecting the gas leaking from the HDA in response to the TEMP1 and the TEMP2.

14. The method as recited in claim 9, wherein the electrical heating element comprises a thermistor.

15. The method as recited in claim 9, wherein the electrical heating element comprises a diode.

16. The method as recited in claim 9, further comprising measuring a temperature proximate the electrical heating element.

17. A disk drive comprising:
a head disk assembly (HDA) filled with a gas, the HDA comprising:
a disk;
a head actuated over the disk;
an electrical heating element; and
control circuitry operable to:
measure a pressure inside the HDA;
heat the electrical heating element for a first heating time;
measure a rate of temperature change of the electrical heating element; and
detect the gas leaking from the HDA in response to the pressure and the rate of temperature change by:
measuring a first temperature (TEMP1) of the electrical heating element after the first heating time;
heating the electrical heating element for a second heating time;
measuring a second temperature (TEMP2) of the electrical heating element after the second heating time; and
detecting the gas leaking from the HDA in response to the TEMP1 and the TEMP2.

18. A method of operating a disk drive comprising a head disk assembly (HDA) filled with a gas, the HDA comprising a head actuated over a disk and an electrical heating element, the method comprising:
measuring a pressure inside the HDA;
heating the electrical heating element for a first heating time;
measuring a rate of temperature change of the electrical heating element; and
detecting the gas leaking from the HDA in response to the pressure and the rate of temperature change by:
measuring a first temperature (TEMP1) of the electrical heating element after the first heating time;
heating the electrical heating element for a second heating time;
measuring a second temperature (TEMP2) of the electrical heating element after the second heating time; and
detecting the gas leaking from the HDA in response to the TEMP1 and the TEMP2.

* * * * *